United States Patent [19]

Yasuda

[11] Patent Number: 4,824,899
[45] Date of Patent: Apr. 25, 1989

[54] RUBBER COMPOSITIONS FOR BEAD FILLER

[75] Inventor: Takuo Yasuda, Tokorozawa, Japan

[73] Assignee: Bridgestone Corporation, Tokyo, Japan

[21] Appl. No.: 122,712

[22] Filed: Nov. 18, 1987

[30] Foreign Application Priority Data

Nov. 18, 1986 [JP] Japan .............................. 61-273017
Jul. 15, 1987 [JP] Japan .............................. 62-174775

[51] Int. Cl.$^4$ .......................... C08K 3/04; C08L 7/00; C08L 9/00; C08L 9/06
[52] U.S. Cl. .................................. 524/495; 152/541; 152/547; 524/533; 524/535
[58] Field of Search ..................... 524/533, 495, 535; 152/547

[56] References Cited

U.S. PATENT DOCUMENTS 4,076,255  2/1978  Moore et al. ..................... 524/533
4,495,326  1/1985  Donatelli et al. ................. 524/533

Primary Examiner—Allan M. Lieberman
Attorney, Agent, or Firm—Sughrue, Mion, Zinn, Macpeak & Seas

[57] ABSTRACT

A rubber composition suitable for use in a bead filler of a tire comprises particular amounts of a reinforcing carbon black, sulfur and acrylic acid metal salt based on 100 parts by weight of natural rubber or a blend of synthetic diene rubber therewith.

5 Claims, 4 Drawing Sheets

FIG_1

FIG_2

FIG_3

RUBBER COMPOSITIONS FOR BEAD FILLER

BACKGROUND OF THE INVENTION

1. Field of the Invention

This invention relates to a rubber composition for a bead filler in a pneumatic tire, and more particularly to a rubber composition suitable for a tire bead filler having excellent durability, ride comfortability against vibrations, cornering stability and processability.

2. Related Art Statement

In pneumatic tires, particularly radial tires, the bead filler rubber largely affects the durability, cornering stability, ride comfortability and so on of the tire. For this end, various examinations have been made with respect to the bead filler rubber. For instance, the improvement of running performances and the like by applying a superhard rubber to a bead filler is disclosed in Japanese Utility Model Application Publication No. 47-16,084, French Patent No. 126,013 and U.S. Pat. No. 4,067,373. In these conventional techniques, however, the durability is substantially left out of consideration.

As a technique considering the durability, therefore, Japanese Patent laid open No. 55-54,337 discloses that a rubber composition comprising a diene rubber such as natural rubber or the like, a novolak type phenolic resin, a curing agent for resin and carbon black is used for the bead filler.

Further, Japanese Patent laid open No. 55-151,053 discloses a rubber composition for bead filler consisting mainly of a polymer obtained by block or graft polymerizing short fiber-like syndiotactic-1,2-polybutadiene with cis-1,4-polybutadiene, a thermosetting resin and a curing agent for improving both the durability and the running performances.

However, these latter conventional techniques have such a drawback that when the thermosetting resin and the curing agent for resin are added to the rubber composition for bead filler in order to enhance the elastic modulus of rubber, since hexamethylenetetramine is used as a curing agent, the strength of polyethylene terephthalate fiber cord is reduced through amine, resulting in the degradation of tire durability as disclosed in Rubber Chemistry and Technology, Vol. 49, No. 4, 1976, pp 1040-1059. On the other hand, when hexamethoxyl methylol melamine is used instead of hexamethylenetetramine as a curing agent for thermosetting phenolic resin, the reduction of strength in the polyethylene terephthalate fiber cord due to amine decomposition can be prevented, but the curing reaction of the resin is accompanied during the processing such as kneading, extrusion or the like, so that there are some problems in the uniform quality and processability.

Further, there is a method of compounding a large amount of carbon black for enhancing the elastic modulus. In this method, however, the fluidity of rubber is considerably degraded, so that there are many restrictions in usual processing equipments for rubber industry such as Banbury mixer, extruder or the like and it is difficult to obtain rubber having a desired high elastic modulus.

On the other hand, high elastic modulus rubber can be obtained by adding a large amount of a cross-linking agent for rubbery polymer such as sulfur or the like. In this case, the bending durability required for bead filler is considerably degraded, so that such an addition is of no practical use.

As mentioned above, the conventional techniques make impossible to provide the rubber composition for tire bead filler satisfying all of running performances, durability, processability and so on.

SUMMARY OF THE INVENTION

It is, therefore, an object of the invention to solve the aforementioned problems and to provide a rubber composition for tire bead filler capable of developing excellent effects on durability, ride comfortability against vibrations, cornering stability and processability.

The inventors have made various studies for solving the above problems and found that vulcanized rubber having high elasticity, extension and fatigue endurance can be obtained by compounding given amounts of reinforcing carbon black and sulfur as a filler and a given amount of a metal salt of acrylic acid with natural rubber or a blend of natural rubber and synthetic diene rubber in the rubber composition for tire bead filler, and as a result the invention has been accomplished.

According to the invention, there is the provision of a rubber composition for a tire bead filler comprising 50~100 parts by weight of reinforcing carbon black, 1~10 parts by weight of sulfur and 1~15 parts by weight of a metal salt of acrylic acid based on 100 parts by weight of natural rubber or a blend of natural rubber and not more than 50% of synthetic diene rubber.

DESCRIPTION OF THE PREFERRED EMBODIMENTS

Figure 1:
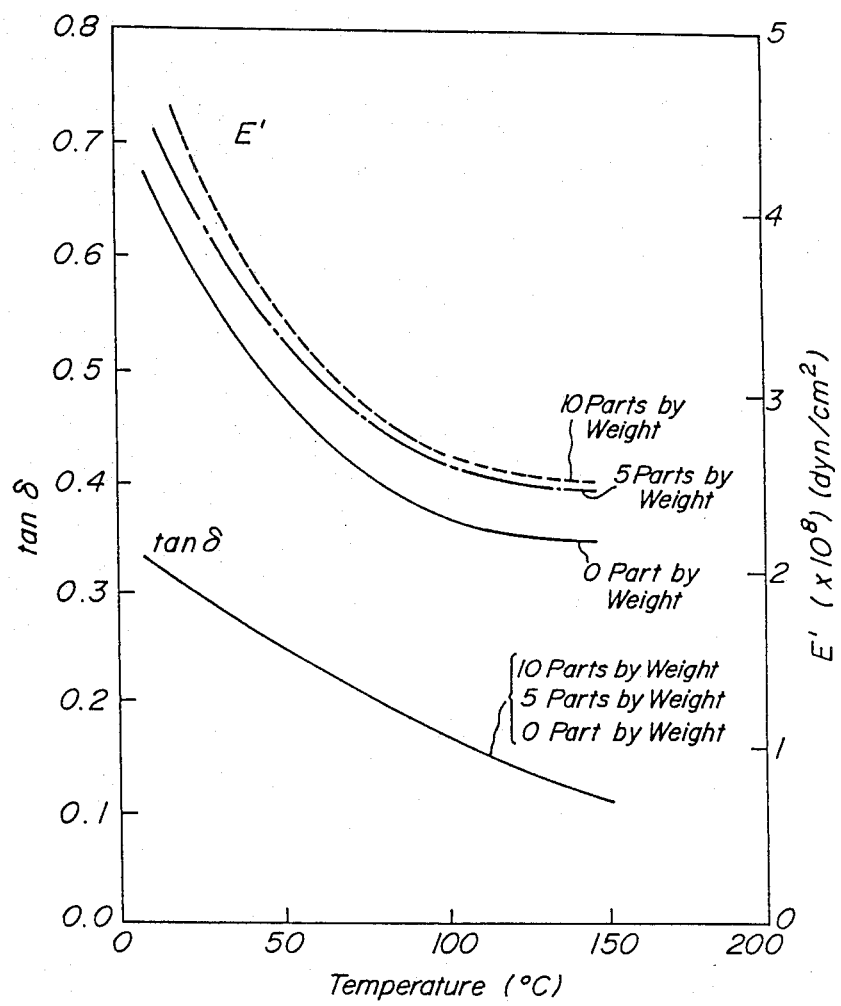
FIG. 1 is a graph showing a relation among temperature, dynamic loss factor (tan δ) and dynamic modulus (E') when varying an amount of aluminum acrylate added according to the invention.

The rubber ingredient used in the invention is a natural rubber alone or a blend of natural rubber and synthetic diene rubber. As the synthetic diene rubber, mention may be made of polyisoprene rubber, high cis-polybutadiene rubber, middle vinyl content polybutadiene rubber having a vinyl content of 35~55%, high vinyl content polybutadiene rubber having a vinyl content of not less than 70%, polybutadiene rubber containing syndiotactic-1,2-polybutadiene, emulsion-polymerized styrene-butadiene copolymer rubber, solution-polymerized styrene-butadiene copolymer rubber, and modified diene rubbers such as carboxylated styrene-butadiene copolymer rubber, epoxidized natural rubber and the like.

The reinforcing carbon black used in the invention is preferable to have an idodine adsorption number of 40~150 mg/g and a dibutyl phthalate absorption of 0.5~1.3 cc/g. In the metal salt of acrylic acid, the metal is particularly preferable to be aluminum or zinc.

Moreover, the rubber composition according to the invention may contain a proper amount of vulcanization accelerator, accelerator activator, antioxidant, softening agent and the like.

The addition of acrylic acid metal salt to rubber ingredient is disclosed in U.S. Pat. No. 4,191,671 and British Patent No. 2,042,553, wherein the rubber composition is cured with a peroxide and is not used for a tire bead filler, so that it does not develop the function and effect of the invention at all. On the other hand, Japanese Patent laid open No. 60-147,451 discloses that the elastic modulus equal to that of sulfur-curing natural rubber composition containing a large amount of carbon black can be obtained by adding zinc dimethacrylate to this rubber composition to reduce the amount of carbon black compounded, whereby the elongation at rupture and resilience can be improved to apply the composition to the tire. However, the simple addition of zinc dimethacrylate makes the elastic modulus high but reduces the elongation at rupture and degrades the fatigue endurance.

On the contrary, the invention is to improve the fatigue endurance without damaging the running performances and ride comfortability against vibrations in the tire. For this purpose, the rubber composition is desirable to have a long fatigue life with a high elastic modulus. From this viewpoint, it is required that the dynamic loss factor (tan $\delta$) is not less than 0.19. In order to satisfy this requirement, the metal salt of acrylic acid used in the invention includes, for example, aluminum acrylate, zinc acrylate, nickel acrylate, cobalt acrylate, lead acrylate, iron acrylate, manganese acrylate, barium acrylate, calcium acrylate and magnesium acrylate. Further, it is desirable that the temperature change in elongation at rupture and elastic modulus of the vulcanized rubber is small, from which it is preferable to use aluminum acrylate, zinc acrylate, calcium acrylate or magnesium acrylate, and the use of aluminum acrylate or zinc acrylate is particularly preferable. Moreover, aluminum acrylate is most preferable from a viewpoint of prolonging the fatigue life.

Although the mechanism of prolonging the fatigue life with high elastic modulus by the addition of acrylic acid metal salt is unclear, it is guessed that the acrylic acid metal salt acts to microscopically mitigate the stress concentration.

In FIG. 1 is shown a relation among temperature, dynamic loss factor (tan $\delta$) and dynamic modulus (E') when the amount of aluminum acrylate added is varied from zero to 10 parts by weight as an additive.

As seen from FIG. 1, tan $\delta$ is unchanged even when varying the addition amount, while E' rises with the increase of the addition amount, resulting in the development of the effect providing high elastic modulus. And also, the elongation at rupture and modulus rise in accomplishment therewith. However, the effect of high elastic modulus comes up to a limit when the addition amount is 15 parts by weight, and is less when the addition amount exceeds 15 parts by weight. Inversely, when the addition amount exceeds 15 parts by weight, the reduction of breaking strength in rubber and the degradation of processability due to the rise of tackiness in the warming up are caused. According to the invention, therefore, the amount of acrylic acid metal salt added is within a range of 1 to 15 parts by weight.

Here, the loss factor (tan $\delta$) and dynamic modulus (E') are measured by using a specimen of 2 mm thickness $\times$ 4.7 mm width $\times$ 20 mm length through a viscoelastic spectrometer (VES-F type) made by Iwamoto Seisaku-sho under conditions that temperature is 25° C., dynamic strain is 1%, frequency is 50 Hz and initial strain is 1%.

The reinforcing carbon black used in the invention is effective to have an iodine adsorption number (IA) of 40~150 mg/g and a dibutyl phthalate absorption (DBPA) of 0.5~1.3 cc/g. Because, when these values are less than the lower limits, the effect of improving the elastic modulus is poor, while when they exceed the upper limits, the dispersibility of carbon black is lowered to degrade the fatigue life and the Mooney viscosity of unvulcanized rubber becomes too high to degrade the processability.

The amount of the reinforcing carbon black added is within a range of 50 to 100 parts by weight for ensuring the elasticity of the tire bead filler together with the given amount (1~10 parts by weight) of sulfur. When the amount of carbon black is less than 50 parts by weight, the elasticity is lacking, while when it exceeds 100 parts by weight, the durability is poor.

Figure 2:
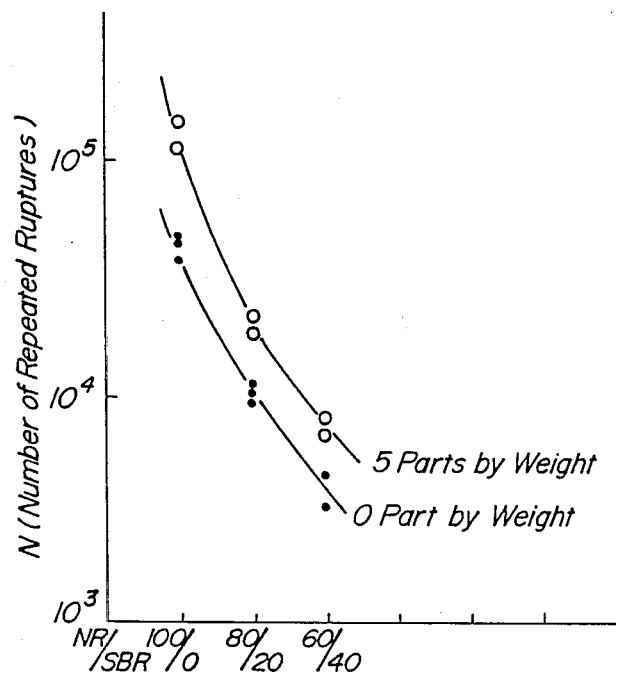
FIG. 2 is a graph showing a relation between a blending ratio (NR/SBR) of natural rubber to styrene-butadiene copolymer rubber and number of repeated ruptures (N) when varying an amount of aluminum acrylate added according to the invention.

In FIG. 2 is shown an effect of improving the fatigue endurance, i.e. the number of repeated ruptures by adding aluminum acrylate to natural rubber alone or a blend of natural rubber and styrene-butadiene copolymer rubber. As seen from FIG. 2, the blending of styrene-butadiene copolymer rubber tends to lower the fatigue endurance, and the amount of styrene-butadiene copolymer rubber blended is restricted up to 50 parts by weight. That is, when the blending amount exceeds 50 parts by weight, the effect of improving the fatigue endurance as the rubber composition is undesirably small.

Here, the number of repeated ruptures is measured by using a specimen of JIS-No. 3 of 2 mm in thickness through a repeated fatigue tester made by Sum Denshi Kikai K.K. under conditions that initial static load is 30 kg/cm$^2$, dynamic repeated load is 20 kg/cm$^2$ and temperature is 27° C.

As previously mentioned, in the rubber composition according to the invention, the high elastic modulus of bead filler rubber is achieved, and the heat build-up is small, and the fatigue resistance can be improved, and the influence to carcass ply cord composed of polyethylene terephthalate fiber is small, and the processability for obtaining uniform quality is excellent. Therefore, the invention may sufficiently contribute to improve the durability, cornering stability and ride comfortability against vibrations in the tire.

The following examples are given in the illustration of the invention and are not intended as limitations thereof.

The following Table 1 shows a compounding recipe (part by weight) of rubber compositions for bead filler used in various examples and Comparative Examples as well as elongation at rupture, modulus, dynamic modulus (E'), dynamic loss factor (tan $\delta$) and number of repeated ruptures of such a rubber composition. Among these properties, E', tan $\delta$ and the number of repeated ruptures were measured by the aforementioned methods, and the elongation at rupture and modulus were measured according to a method of JIS K6301.

For instance, the rubber composition of Example 1 was prepared as follows. That is, 100 parts by weight of natural rubber was placed in a Banbury mixer, to which were added stearic acid, zinc white, carbon black and aluminum acrylate and then vulcanization accelerator and sulfur were added thereto.

The rubber compositions of other Examples and Comparative Examples were prepared by the same method as described above.

TABLE 1(a)

|  | Comparative Example (Conventional technique) 1 | Comparative Example 2 | Comparative Example 3 | Comparative Example 4 | Example 1 |
|---|---|---|---|---|---|
| Kind of rubber composition | A | B | C | D | E |
| Natural rubber | 30 | 100 | 100 | 80 | 100 |
| SBR 1500 *1 | — | — | — | 20 | — |
| BR 01 *2 | 70 | — | — | — | — |
| Carbon black (N326) *6 | 70 | 75 | 95 | 75 | 75 |
| Carbon black (N472) *8 | — | — | — | — | — |
| Carbon black (N339) *7 | — | — | — | — | — |
| Carbon black (N539) *9 | — | — | — | — | — |
| Stearic acid | 2 | 2 | 2 | 2 | 2 |
| Process oil | 5 | — | — | — | — |
| Zinc white | 5 | 6 | 6 | 6 | 6 |
| Antioxidant *3 | 1 | 1 | 1 | 1 | 1 |
| Vulcanization accelerator *4 | 0.8 | 0.8 | 0.8 | 0.8 | 0.8 |
| Sulfur | 4 | 6 | 6 | 6 | 6 |
| Arnopol PN844 *5 | 10 | — | — | — | — |
| Hexamethylenetetramine | 1.5 | — | — | — | — |
| Aluminum acrylate | — | — | — | — | 5 |
| Zinc acrylate | — | — | — | — | — |
| Calcium acrylate | — | — | — | — | — |
| Elongation at rupture (%) | 200 | 155 | 130 | 120 | 165 |
| 25% Modulus (kg/cm$^2$) | 48 | 23 | 26 | 29 | 24 |
| Dynamic modulus E' ($\times 10^8$ dyn/cm$^2$) | 4.2 | 3.5 | 4.0 | 3.9 | 3.8 |
| Dynamic loss factor tan δ | 0.18 | 0.29 | 0.32 | 0.33 | 0.28 |
| Fatigue life (number of repeated ruptures) | $0.6 \times 10^4$ | $3 \times 10^4$ | $0.8 \times 10^4$ | $1 \times 10^4$ | $12 \times 10^4$ |
| E'/tan δ ($\times 10^8$ dyn/cm$^2$) | 23.3 | 12.1 | 12.5 | 11.8 | 13.6 |

TABLE 1(b)

|  | Example 2 | Example 3 | Example 4 | Example 5 | Example 6 |
|---|---|---|---|---|---|
| Kind of rubber composition | F | G | H | I | J |
| Natural rubber | 80 | 60 | 60 | 100 | 80 |
| SBR 1500 *1 | 20 | 40 | — | — | 20 |
| BR 01 *2 | — | — | 40 | — | — |
| Carbon black (N326) *6 | 75 | 75 | 75 | 75 | 75 |
| Carbon black (N472) *8 | — | — | — | — | — |
| Carbon black (N339) *7 | — | — | — | — | — |
| Carbon black (N539) *9 | — | — | — | — | — |
| Stearic acid | 2 | 2 | 2 | 2 | 2 |
| Process oil | — | — | — | — | — |
| Zinc white | 6 | 6 | 6 | 6 | 6 |
| Antioxidant *3 | 1 | 1 | 1 | 1 | 1 |
| Vulcanization accelerator *4 | 0.8 | 0.8 | 0.8 | 0.8 | 0.8 |
| Sulfur | 6 | 6 | 6 | 6 | 6 |
| Arnopol PN844 *5 | — | — | — | — | — |
| Hexamethylenetetramine | — | — | — | — | — |
| Aluminum acrylate | 5 | 5 | 5 | — | — |
| Zinc acrylate | — | — | — | 5 | 5 |
| Calcium acrylate | — | — | — | — | — |
| Elongation at rupture (%) | 130 | 120 | 110 | 170 | 145 |
| 25% Modulus (kg/cm$^2$) | 31 | 34 | 21 | 34 | 38 |
| Dynamic modulus E' ($\times 10^8$ dyn/cm$^2$) | 4.1 | 4.6 | 3.2 | 4.8 | 5.3 |
| Dynamic loss factor tan δ | 0.29 | 0.32 | 0.21 | 0.28 | 0.29 |
| Fatigue life (number of repeated ruptures) | $2 \times 10^4$ | $0.7 \times 10^4$ | $0.6 \times 10^4$ | $2 \times 10^4$ | $0.8 \times 10^4$ |
| E'/tan δ ($\times 10^8$ dyn/cm$^2$) | 14.1 | 14.4 | 15.2 | 17.1 | 18.3 |

TABLE 1(c)

| | Example 7 | Comparative Example (Conventional technique) 5 | Example 8 | Example 9 |
|---|---|---|---|---|
| Kind of rubber composition | K | L | M | N |
| Natural rubber | 100 | 100 | 80 | 80 |
| SBR 1500 *1 | — | — | 20 | 20 |
| BR 01 *2 | — | — | — | — |
| Carbon black (N326) *6 | 75 | 70 | 75 | 75 |
| Carbon black (N472) *8 | — | — | — | — |
| Carbon black (N339) *7 | — | — | — | — |
| Carbon black (N539) *9 | — | — | — | — |
| Stearic acid | 2 | 2 | 2 | 2 |
| Process oil | — | — | — | — |
| Zinc white | 6 | 7.5 | 6 | 6 |
| Antioxidant *3 | 1 | — | 1 | 1 |
| Vulcanization accelerator *4 | 0.8 | 1.5 | 0.8 | 0.8 |
| Sulfur | 6 | 4 | 6 | 6 |
| Arnopol PN844 *5 | — | 8 | — | — |
| Hexamethylenetetramine | — | 1.2 | — | — |
| Aluminum acrylate | — | — | 10 | — |
| Zinc acrylate | — | — | — | 10 |
| Calcium acrylate | 5 | — | — | — |
| Elongation at rupture (%) | 110 | 220 | 140 | 140 |
| 25% Modulus (kg/cm$^2$) | 42 | 45 | 31 | 43 |
| Dynamic modulus E' ($\times 10^8$ dyn/cm$^2$) | 5.7 | 4.1 | 4.3 | 6.2 |
| Dynamic loss factor tan δ | 0.29 | 0.19 | 0.29 | 0.33 |
| Fatigue life (number of repeated ruptures) | $1 \times 10^4$ | $1 \times 10^4$ | $2.5 \times 10^4$ | $0.5 \times 10^4$ |
| E'/tan δ ($\times 10^8$ dyn/cm$^2$) | 19.6 | 21.6 | 14.8 | 18.8 |

TABLE 1(d)

| | Comparative Example (Conventional technique) 6 | Example 10 | Example 11 | Comparative Example 7 | Example 12 |
|---|---|---|---|---|---|
| Kind of rubber composition | O | P | Q | R | S |
| Natural rubber | 100 | 80 | 80 | 80 | 80 |
| SBR 1500 *1 | — | 20 | 20 | 20 | 20 |
| BR 01 *2 | — | — | — | — | — |
| Carbon black (N326) *6 | 70 | 85 | — | — | — |
| Carbon black (N472) *8 | — | — | — | 75 | — |
| Carbon black (N339) *7 | — | — | 75 | — | — |
| Carbon black (N539) *9 | — | — | — | — | 75 |
| Stearic acid | 2 | 2 | 2 | 2 | 2 |
| Process oil | — | — | — | — | — |
| Zinc white | 7.5 | 6 | 6 | 6 | 6 |
| Antioxidant *3 | — | 1 | 1 | 1 | 1 |
| Vulcanization accelerator *4 | 1.5 | 0.8 | 0.8 | 0.8 | 0.8 |
| Sulfur | 4 | 6 | 6 | 6 | 6 |
| Arnopol PN844 *5 | 20 | — | — | — | — |
| Hexamethylenetetramine | 2.0 | — | — | — | — |
| Aluminum acrylate | — | — | 5 | 5 | 5 |
| Zinc acrylate | — | 5 | — | — | — |
| Calcium acrylate | — | — | — | — | — |
| Elongation at rupture (%) | 225 | 125 | 145 | 110 | 140 |
| 25% Modulus (kg/cm$^2$) | 45 | 42 | 29 | 42 | 28 |
| Dynamic modulus E' ($\times 10^8$ dyn/cm$^2$) | 7.2 | 5.7 | 4.0 | 4.8 | 3.1 |
| Dynamic loss factor tan δ | 0.18 | 0.32 | 0.26 | 0.38 | 0.22 |
| Fatigue life (number of repeated ruptures) | $0.5 \times 10^4$ | $0.7 \times 10^4$ | $1.7 \times 10^4$ | $0.5 \times 10^4$ | $1.5 \times 10^4$ |
| E'/tan δ ($\times 10^8$ dyn/cm$^2$) | 40.0 | 17.8 | 15.4 | 12.6 | 14.1 |

Figure 3:
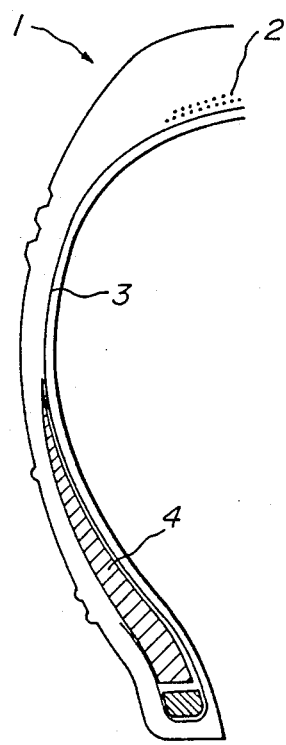
FIG. 3 is a schematically partial section view of an embodiment of the tire according to the invention.

*1 Styrene-butadiene copolymer rubber, made by Japan Synthetic Rubber Co., Ltd.
*2 Polybutadiene rubber, made by Japan Synthetic Rubber Co., Ltd.
*3 2,2'-methylene bis(4-methyl-6-tert-butylphenol)
*4 N—oxydiethylene-2-benzothiazylsulfeneamide
*5 Alkylphenol novolak resin, trade name, made by Hoechst
*6 IA 86 mg/g, DBPA 0.75 cc/g
*7 IA 90 mg/g, DBPA 1.19 cc/g
*8 IA 270 mg/g, DBPA 2.00 cc/g
*9 IA 42 mg/g, DBPA 1.09 cc/g Next, the effect of the rubber composition was evaluated when it was used as a bead filler of a tire. As shown in FIG. 3, a tire 1 having a size of 185/70SR14 comprised a belt 2 of two steel cord layers, a carcass 3 of single cord ply containing polyethylene terephthalate fiber cords of 1500 denier/2, and a bead filler 4 made from the rubber composition of Table 1. The high-speed running property, cornering stability, ride comfortability against vibrations and durability were evaluated as follows.

(1) Test for high-speed running property

The test tire was mounted onto a 5J rim and trained on a metal drum of 1.7 m in diameter at a speed of 80 km/hr under an internal pressure of 2.1 kg/cm$^2$ and a load of 390 kg for 2 hours and then left to stand for 3 hours. Thereafter, the test tire was run at a speed of 121 km/hr for 30 minutes, and then the running speed was raised at a rate of 8 km/hr every 30 minutes until the trouble occurred. In this way, the speed causing the trouble and the running time at this speed were measured.

(2) Test for cornering stability

The test tire subjected to normal internal pressure and load according to JIS D4230 was run on a drum of 2.5 m in diameter, during which the cornering force was measured by changing a slip angle. The cornering force per slip angle was represented as a cornering power by an index on a basis that the control tire of Comparative Example 1 was 100. The larger the index value, the better the cornering response of the tire at slip angle.

The maximum cornering force was a highest value of the cornering force when increasing the slip angle, and was represented by an index on a basis that Comparative Example 1 was 100. The larger the index value, the better the road gripping property of the tire at large slip angle.

(3) Test for ride comfortability against vibrations

The test tire subjected to normal internal pressure and load was run on a drum of 1.7 m in diameter provided at its outer surface with an iron protrusion (height: 9.5 mm), during which the fluctuating force of load applied to the fixed shaft for the tire was measured in the riding over the protrusion and represented by an index on a basis that Comparative Example 1 was 100. The larger the index value, the smaller the fluctuating force in the riding over the protrusion and the better the ride comfortability.

(4) Special drum test for durability

The test tire was run on a drum of 1.7 m in diameter at a speed of 60 km/hr under such conditions of excessive load and internal pressure that strain energy concentrated at turnup end of carcass ply was about 4 times of strain energy usually produced in the actual running, during which the running distance until troubles occurred at the carcass ply end was measured as a durability. Moreover, the running distance up to 30,000 km was acceptable.

After the running over 20,000 km under the above conditions, the carcass ply cords were cut out from the tire, and the strength of the carcass ply cord adjacent to the bead filler was measured, which was represented by an index on a basis that Comparative Example 1 was 100. The larger the index value, the smaller the degradation of cord by the durability test.

Figure 4:
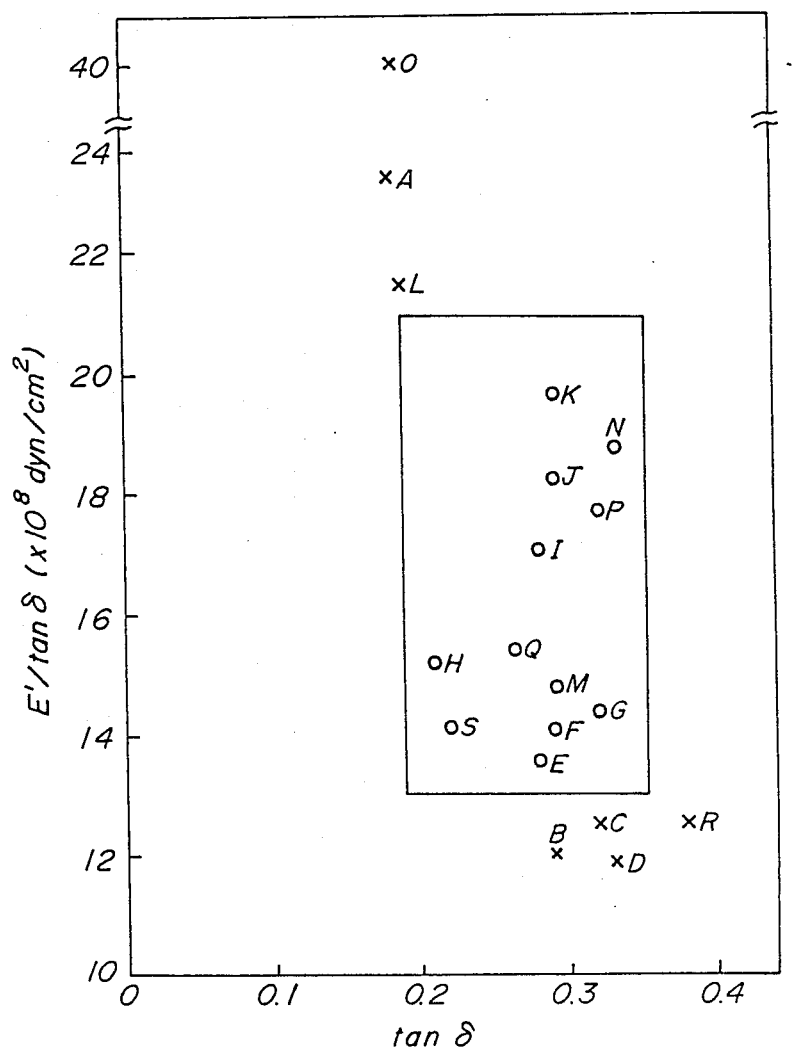
FIG. 4 is a graph showing a range of excellent cornering stability, ride comfortability against vibrations and durability in relation to tan δ and E'/tan δ.

The results measured with respect to Comparative Examples 1, 4 and 5 and Examples 1, 2, 4, 7 and 10 are shown in the following Table 2. Further, the relation among cornering stability, ride comfortability against vibrations and durability in all rubber compositions of Table 1 was examined in connection with tan δ and E'/tan δ to obtain results as shown in FIG. 4.

TABLE 2

|  |  | Comparative Example 1 | Comparative Example 4 | Example 1 | Example 2 | Example 4 | Example 7 | Example 10 | Comparative Example 5 |
|---|---|---|---|---|---|---|---|---|---|
| High speed running property | speed (Km/hr) | 185 | 185 | 185 | 185 | 185 | 185 | 185 | 185 |
|  | running time (min) | 2 | 4 | 15 | 20 | 14 | 15 | 17 | 4 |
| Cornering stability | cornering power (index) | 100 | 96 | 99 | 99 | 99 | 100 | 100 | 100 |
|  | maximum cornering force (index) | 100 | 102 | 103 | 103 | 102 | 101 | 101 | 100 |
|  | ride comfortability against vibrations (index) | 100 | 101 | 101 | 101 | 101 | 100 | 100 | 100 |
| Special drum test for durability | running distance (km) | 30,000 | 19,000 | 30,000 | 30,000 | 30,000 | 30,000 | 30,000 | 30,000 |
|  | trouble state | Cracks occurred at carcass ply end | Troubles occurred at carcass ply end | none | none | none | Microcracks occurred at carcass ply end | none | Cracks occurred at carcass ply end |
| Strength of carcass ply cord |  | 100 | 160 | 160 | 160 | 170 | 160 | 155 | 165 |

As seen from the results of Table 2, the rubber composition of Example 2 is excellent in all of high-speed running property, cornering stability, durability and cord strength as compared with the rubber compositions of Comparative Examples 1 and 5.

Furthermore, it is confirmed from FIG. 4 that tan δ and E'/tan δ are required to be within given ranges in order to develop excellent effects on the cornering stability, ride comfortability against vibrations and durability. That is, tan δ is preferable within a range of 0.19~0.35. When tan δ is less than 0.19, the vibration damping property is poor to degrade the ride comfortability against vibrations, while when it exceeds 0.35, the heat build-up of the bead portion becomes larger to degrade the durability. On the other hand, E'/tan δ is preferable within a range of $13 \times 10^8 \sim 21 \times 10^8$ dyn/cm$^2$. When E'/tan δ is less than $13 \times 10^8$ dyn/cm$^2$, the tire response at a given slip angle is small, while when it exceeds $21 \times 10^8$ dyn/cm$^2$, the friction force between tire and road surface at a large slip angle is reduced to cause a risk.

As mentioned above, in the rubber composition for tire bead filler according to the invention, the excellent effects are developed on all of the durability, ride comfortability against vibrations and cornering stability, and also the excellent effect on the processability can be developed because the rubber composition contains no thermosetting resin, curing agent, excessive amount of carbon black or sulfur as in the conventional rubber composition.

What is claimed is:

1. A rubber composition for a tire bead filler comprising:
   (A) 50~100 parts by weight of reinforcing carbon black,
   (B) 1~10 parts by weight of sulfur, and
   (C) 1~15 parts by weight of a metal salt of acrylic acid selected from the group consisting of aluminum acrylate, zinc acrylate, nickel acrylate, cobalt acrylate, lead acrylate, iron acrylate, manganese acrylate, barium acrylate, calcium acrylate and magnesium acrylate, based on 100 parts by weight of natural rubber or a blend of natural rubber and not more than 50% of synthetic diene rubber.

2. The rubber composition according to claim 1, wherein said reinforcing carbon black has an iodine adsorption number of 40~150 mg/g and a dibutyl phthalate absorption of 0.5~1.3 cc/g.

3. The rubber composition according to claim 1, wherein said metal salt of acrylic acid is selected from the group consisting of aluminum acrylate and zinc acrylate.

4. The rubber composition according to claim 1, wherein said synthetic diene rubber is selected from the group consisting of polyisoprene rubber, high cis-polybutadiene rubber, middle vinyl content polybutadiene rubber, high vinyl content polybutadiene rubber, polybutadiene rubber containing syndiotactic-1,2-polybutadiene, emulsion-polymerized styrene-butadiene copolymer rubber, solution-polymerized styrene-butadiene copolymer rubber and modified diene rubber.

5. The rubber composition according to claim 4, wherein said modified diene rubber is selected from the group consisting of carboxylated styrene-butadiene copolymer rubber and epoxidized natural rubber.

* * * * *